United States Patent [19]

Taguchi et al.

[11] Patent Number: 5,250,796
[45] Date of Patent: Oct. 5, 1993

[54] NOISE REDUCTION SYSTEM FOR OPTICAL RECORD AND REPRODUCTION APPARATUS USING AUTO-POWER CONTROLLED SEMICONDUCTOR LASER DEVICE

[75] Inventors: Toyoki Taguchi, Yokohama; Toshihiro Sugaya, Ibaraki; Hisashi Yamada; Kei Shimura, both of Yokohama, all of Japan

[73] Assignee: Kabushiki Kaisha Toshiba, Kawasaki, Japan

[21] Appl. No.: 942,463

[22] Filed: Sep. 9, 1992

[30] Foreign Application Priority Data

Sep. 9, 1991 [JP] Japan ................. 3-229148
Mar. 25, 1992 [JP] Japan ................. 4-66849

[51] Int. Cl.⁵ ........................... G01J 1/32; G11B 7/00
[52] U.S. Cl. ........................... 250/205; 369/116; 250/214 C
[58] Field of Search ............ 250/201.5, 205, 214 R, 250/214 C; 369/116, 44.11, 44.26, 44.41, 44.29, 44.27

[56] References Cited

U.S. PATENT DOCUMENTS

| | | | |
|---|---|---|---|
| 4,788,674 | 11/1988 | Maeda et al. | 369/116 |
| 4,837,428 | 6/1989 | Takagi et al. | 250/205 |
| 4,908,815 | 3/1990 | Gregg et al. | 369/116 |
| 4,989,198 | 1/1991 | Kojima et al. | |
| 5,023,860 | 6/1991 | Ueda | 250/201.5 |
| 5,040,163 | 8/1991 | Sasaki et al. | 250/205 |
| 5,059,780 | 10/1991 | Kakuta et al. | 250/205 |
| 5,097,473 | 3/1992 | Taguchi. | |
| 5,105,413 | 4/1992 | Bakx | 369/116 |

FOREIGN PATENT DOCUMENTS

| | | |
|---|---|---|
| 56-37834 | 4/1981 | Japan. |
| 57-154660 | 9/1982 | Japan. |
| 57-200953 | 12/1982 | Japan. |
| 63-271225 | 11/1988 | Japan. |
| 0438721 | 2/1992 | Japan. |

*Primary Examiner*—David C. Nelms
*Assistant Examiner*—Michael Messinger
*Attorney, Agent, or Firm*—Oblon, Spivak, McClelland, Maier & Neustadt

[57] ABSTRACT

An optical disk apparatus includes a semiconductor laser for emitting a light beam, and an automatic power control or APC circuit for driving the laser. A compound prism structure is optically coupled to the laser in an optical head section, and defines a first optical path for causing a front laser light to be projected onto a rotating optical disk and guiding a reflected light therefrom toward a first photodetector, and a second optical path for guiding a part of the reflected light toward a second photodetector. An output signal of the first photodetector is used to generate a reproduced information signal. An output signal of the second photodetector is fed back to the APC circuit as a front light monitor signal. A part of a laser control signal internally generated in the APC circuit is supplied through a wiring line to a noise reduction circuit as a laser noise monitor signal. The noise reduction circuit subtracts this noise monitor signal from the reproduced information signal to provide a noise-suppressed information signal.

25 Claims, 7 Drawing Sheets

NOISE REDUCTION SYSTEM FOR OPTICAL RECORD AND REPRODUCTION APPARATUS USING AUTO-POWER CONTROLLED SEMICONDUCTOR LASER DEVICE

BACKGROUND OF THE INVENTION

1. Field of the Invention

The present invention relates generally to a light-emission drive/control system for solid-state optical devices, and more particularly to an optical record and reproduction apparatus for writing and/or reading information into or from an optical record carrier body by using a semiconductor laser device.

2. Description of the Related Art

Recently, an optical record/reproduction apparatus that stably stores an increased amount of information at higher recording density is becoming important more and more. In the recent manufacture of highly advanced digital equipment such as a computer system, an external storage unit employed therein is required to increase in the information storage capacity, as the computer tasks increase to meet a trend that the system deals with video movie images as well as static graphics images. Also, in the manufacture of a home-use or an industrial use video movie playback apparatus, as the quality of a reproduced image (the horizontal and vertical resolutions) increases, the required recording density of a record carrier body should increase to achieve an extended length of playback time. In either case, as the recording density increases, it will become more critical and less feasible to achieve higher operation reliability of the high-density record and reproduction apparatus.

The presently available optical record and reproduction apparatus employs a solid-state light-emitting device to read or reproduce information being stored in a rotatable round disk-shaped optical record carrier body. Such a record carrier body is generally called the "optical disk"; it may spell "optical disc" alternatively. A variety of types of optical disks are presently available, including an additional-write optical disk, phase-change (PC) type optical disks that can allow overwrite, a magneto-optical (MO) disks, and so forth. The solid-state light emitting device may be a semiconductor laser. The laser emits a light beam at a selected wavelength, which is projected onto the information record layer of a rotating optical disk. A reflected light from the optical disk is guided to enter an optical detector (photodetector). The photodetector detects the reflected light to generate an electrical signal indicative of reproduced information.

With the increasing needs for high performance and reliability of the optical record and reproduction apparatus (also referred to as the "optical disk drive apparatus," or "optical disk drive"), the high-accuracy drive of semiconductor laser devices has been demanded strongly. In particular, to attain an enhanced quality of the reproduced information such as an optical-disk image it is one of the most important subjects that the optical disk record/reproduction apparatus maintains the signal-to-noise ratio of a reproduced image as high as possible. The improvement of the signal-to-noise ratio of the reproduced image may affect the maintenance of high-density record performance of the optical disk, because such signal-to-noise ratio improvement leads to a decrease in the total storage amount of information signals to be written into the optical disk, causing a resultant effective recording density to increase.

To improve the signal-to-noise ratio of the optical disk record/reproduction apparatus, it is indispensable to suppress or prevent a noise (laser noise) from being generated in the semiconductor laser itself. In the employment of any one of the various types of optical disks indicated above, the laser noise is required to remain $-120$ dB/Hz or less in the relative-intensity-noise (RIN). Unfortunately, the simple use of the existing semiconductor laser may decrease the RIN causing it to range from $-105$ to $-110$ dB/Hz when the laser is 830 nanometers (nm) in oscillation wavelength and 40 mW in output power.

Conventionally, the "wide-band front-light automatic power control (APC)" method is known and utilized to suppress or eliminate the laser noise generation while allowing a presently available semiconductor laser to be used as a light source of the optical disk record/reproduction apparatus. The wide-band APC is described, for example, in H. Satoh et al., "Fast Laser Power Control for High density Optical Disk Systems," Optical Data Storage Conference, Feb. 25–26, 1991, at pp. 182–185/WA4. With the APC method, a part of a front light of a semiconductor laser being actually projected onto the optical disk in a read or playback mode is guided to a photodetector which converts it into a corresponding electrical detection signal. The detection signal may be used for the control of the light output of the semiconductor laser. Unlike a "rear-light" APC using a rear light emitted from the rear surface of the semiconductor laser as a monitor light, the front-light APC can attain an expanded controllable frequency band (control range) in its control loop, thus enabling the laser noise generation to decrease depending on the loop gain of the control system.

In the wide-band front-light APC, whether or not the maximum advantage can be taken therefrom may hang o the very point of how much the controllable range can be broadened with respect to the frequency band of a reproduced signal. An example of the feed-forward control technique providing such broad control range is disclosed in U.S. Pat. No. 5,097,473 by Toyoki Taguchi under the title of "Stabilized-Feedback Control Device For Semiconductor lasers."

However, the recent innovations are never satisfied with the improvement of the signal-to-noise ratio in the optical disk record/reproduction apparatus based on the laser noise reduction method, and still demands further improvement in accommodation for the future use. Particularly, the requirement to improve the signal-to-noise ratio in the high frequency band becomes very critical in the reproduction of higher precision image; on high-density optical disks. Under such a condition, a highly advanced laser control technique is demanded which can provide a more powerful laser noise reduction than ever.

SUMMARY OF THE INVENTION

It is therefore an object of the present invention to provide a new and improved noise reduction technique for a solid-state light emission device.

It is another object of the invention to provide a new and improved laser-noise reduction apparatus which can attain an enhanced signal-to-noise ratio in the reproduction of a high-density optical record carrier body.

It is still another object of the invention to provide a new and improved optical record and reproduction apparatus which can achieve an enhanced signal-to-noise ratio in the reproduction of information being stored in a high-density optical record carrier body.

In accordance with the above objects, the present invention is drawn to a specific apparatus for suppressing or eliminating a noise from a reproduced information signal read out of an optical record carrier body using a solid-state light emission device, which apparatus includes a driver for receiving a control voltage signal externally supplied thereto to designate a light emission of the light emission device, and for supplying the light emission device with a corresponding drive current signal in response to the control signal. An optical detector is provided for partially receiving a front light emitted by the light emission device, and for generating a detection current signal corresponding in magnitude to a detected amount of light. A compensator is coupled to the driver and the optical detector, for generating a voltage signal that compensates for a possible variation in the front light emitted by the light emission device, which is fed back to the driver. This voltage signal is also supplied to a noise reduction section, which receives the reproduced information signal. The noise reduction section uses the voltage signal as a noise monitor signal, and subtracts this noise monitor signal from the reproduced information signal to generate a noise-suppressed reproduction signal.

The foregoing and other objects, features, and advantages of the invention will become apparent from the following more particular description of preferred embodiments of the invention, as illustrated in the accompanying drawings.

DETAILED DESCRIPTION OF THE PREFERRED EMBODIMENTS

Figure 1:
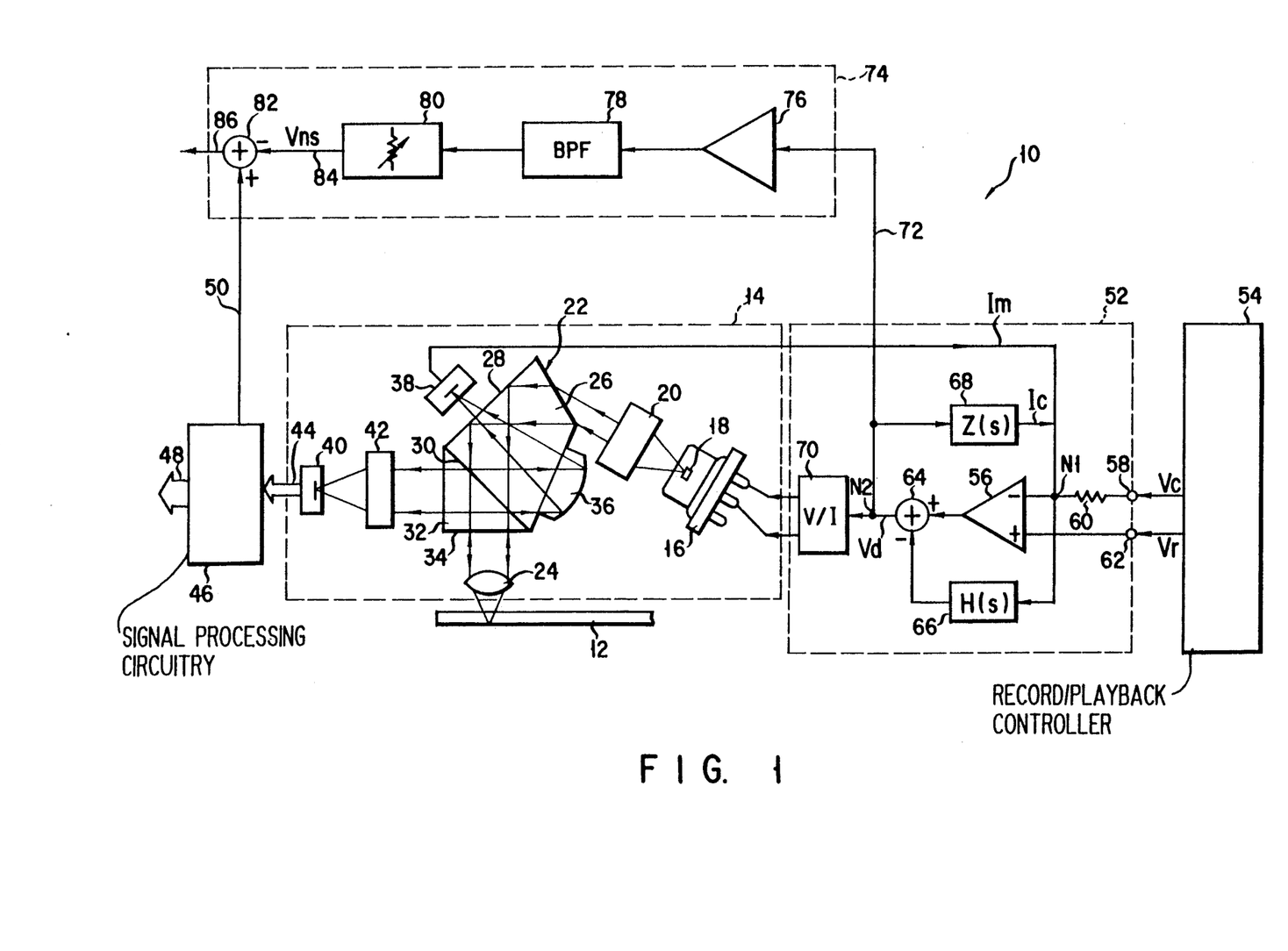
FIG. 1 is a diagram showing one embodiment of an optical disk record/reproduction apparatus in accordance with the principles of the present invention.

Referring now to FIG. 1, an optical record and reproduction (playback) apparatus in accordance with one preferred embodiment of the present invention is generally designated by the numeral 10. The optical record/playback apparatus 10 is arranged to play back or reproduce information recorded on a round disk-shaped optical carrier body 12. As is well known, this carrier body may be an optical disk (or optical disc) which has a round disk-shaped substrate, a radiation-sensitive information-record layer provided thereon, and a transparent protection film overlying the information layer. The intermediate information layer is provided with a specific surface configuration called the "pit train that is formed or defined by using either a known "stamper" process or a projection of a write light-beam onto the information layer along a spiral track or a plurality of concentric tracks. The apparatus 10 will be called an "optical disk record/playback apparatus" or "optical disk drive apparatus", or, more simply, "optical disk drive" in the rest of the description.

The optical disk 12 is set in a known rotation drive mechanism (not shown) including a rotary motor and a spindle, which is driven by the motor causing disk 12 to rotate at a constant or variable velocity. The optical disk drive apparatus 10 includes an optical head section 14, which faces the rotating disk 12 and may move linearly in the radial direction of disk 12. Optical head section 14 includes a semiconductor laser device 16 as a light source. Semiconductor laser device 16 contains therein a semiconductor laser chip 18, which emits and sends forth an oscillated light beam at a preselected wavelength. The laser light beam is projected onto the rotating optical disk 12 by way of an optical system including a collimator lens 20, a compound prism structure 22, and an objective 24. Compound prism structure 22 essentially consists of a beam-shape converting prism 26, an optical plane 28 serving as a reflection mirror, another optical plane 30 functioning as a polarization beam splitter, a triangle prism 32, a ¼ wavelength ($\lambda/4$) plate 34 and a concave mirror 36.

As shown in FIG. 1, the optical head section 14 includes two photodetectors 38 and 40. First photodetector 38 is arranged to face one optical plane of the beam-shape converting prism 26, and receives a reflected light from concave mirror 36. Second photodetector 40 is a multiple division photodetector, which is arranged to face one of the two optical planes of triangular prism 32, the other of which faces the objective 24, at a constant distance therebetween. Second photodetector 40 has a predetermined number of divided photosensitive areas. A condenser unit 42 including a condenser lens is arranged between photodetector 40 and triangular prism 32. A light component output from triangular prism 32 is condensed by condenser 42 and is then concentrated on photodetector 40. Photodetectors 38, 40 may be p-i-n photodiodes.

After passing through the collimator lens 20, the light emitted by the semiconductor laser device 16 is divided by compound prism structure 22 into two light components that progress along two different optical paths. The main component of the laser light is used as a read light, which is projected through objective 24 onto the information-record layer (not shown) of the rotating optical disk 12. The subsidiary component of the laser light is reflected by concave mirror 36 to photodetector 38 as a condensed light beam.

More specifically, the output light of the semiconductor laser chip 18 in the light source 16 is first reshaped by collimator lens 20 to a parallel luminous flux light beam, which is then converted by beam-shape conversion prism 26 into a beam of almost circular profile. This circular-profile beam is totally reflected by optical plane 28 toward tilted optical plane 30. Plane 30 is a polarization beam splitter, which allows the transmission of about 90 percent of the circular beam therethrough. The transmitted light passes through $\lambda/4$ plate 34 to become a circularly polarized light beam. This light beam goes to objective 24, which causes it to be focused on the information layer of optical disk 12.

Note here that the power of an incident light to the optical disk 12 may vary in accordance with the operation modes of the optical disk drive apparatus 10. In a write (record) mode of apparatus 10, semiconductor laser chip 18 emits a high-power light beam with a power ranging from 10 to 20 milliwatts (mW). In a read (playback or reproduction) mode laser chip 18 sends forth a low-power light beam that is approximately one tenth the write beam in magnitude, that is, 1 to 2 mW. Obviously, the high-power beam is a write beam for forming a series of pits on the information layer of optical disk 12; the low-power beam is a read beam for reading or playing back the stored information of optical disk 12.

A reflected light from the optical disk 12 passes through objective 24 to be optically converted into a parallel beam, which returns along the optical path previously described. More specifically, the reflected light passes through λ/4 plate 34 to become a linearly polarized light. The plane of polarization of this light is rotated through 90 degrees inside triangle prism 32; therefore, approximately the 90% of the polarized light is reflected to condenser 42 by polarization beam splitter 30. Condenser 42 sends forth a condensed light beam of higher intensity, which is concentrated on multi-division photodetector 40. Photodetector 40 produces a current of corresponding magnitude in its divided photosensitive areas. A current signal 44 appears at the output of photodetector 40. Current signal 44 is supplied to a signal processing circuitry 46 associated with the optical head section 14. Signal processing circuitry 46 includes a known preamplifier serving as a signal amplifier and a known processing circuit. Signal processor 46 carries out a known current-to-voltage (I/V) conversion so that current signal 44 is converted into a corresponding voltage signal, which is then subjected to necessary signal-processings thereby to produce a servo signal 48 for focussing/ tracking control and a reproduced information signal 50 electrically indicative of the stored information of optical disk 12.

Of the output light of the semiconductor laser chip 18, the remaining 10 percent of the light reflected by the polarization beam splitter 30 is forced to enter the concave mirror 36 as a front monitor light. As shown in FIG. 1, concave mirror 36 causes the light component to be concentrated on photodetector 38. Photodetector 38 generates an electrical detection signal (current signal) that corresponds in magnitude to the intensity of the incident light thereonto. This signal is a monitor signal Im, which acts as a control signal for automatic power control (APC) to be described later. Under such circumstances, it is recommendable that photodetector 38 comprises a specific p-i-n photodiode being higher in speed than the multi-division photodetector 40.

The reason why the 10%-light component of the output beam of the semiconductor laser chip 18 being reflected by polarization beam splitter 30 is employed as the front monitor light to be concentrated on the APC photodetector 38 is as follows. The bad influence of laser noise becomes most severe in the playback mode of the optical disk drive 10. At this time, the read beam emitted by laser chip 18 is about 1 to 2 mW as previously described. Accordingly, using the 10%-light component as the front monitor light ensures that the amount of incident light on photodetector 38 is sufficient for the purposes of photodetection.

As shown in FIG. 1, the optical disk drive apparatus 10 includes a laser control circuit 52, which is coupled to the optical head section 14 and an optical information record/playback control circuit 54. The laser controller 52 is the circuitry that electrically drives the semiconductor laser device 16 and that performs a stabilized feedback control for laser-noise reduction in accordance with a wide-band automatic power control (APC) scheme. This circuit will be referred to as the "APC unit" hereinafter. One typical circuit configuration of APC unit 52 is described for example in U.S. Pat. No. 5,097,473, Toyoki Taguchi, filed Dec. 20, 1990 (Date of Patent is Mar. 17, 1992).

The APC unit 52 includes an operational amplifier 56. This amplifier has an inverting input connected to a first input terminal 58 through a resistive element 60 for current-to-voltage conversion, and a non-inverting input coupled to a second input terminal 62. The first terminal 58 is supplied with control signal (modulation signal) Vc by the record/playback controller 54. The second terminal 60 is applied by controller 54 with a reference signal Vr for the control signal Vc, which potentially indicates a reference voltage having a constant level for the control signal Vc. Amplifier 56 is connected at its output to a first input of an adder circuit 64. Amplifier 56 receives control voltage Vc by way of resistive element 60, detects any difference between monitor signal Im and a control current signal flowing through resistive element 60, and produces an output voltage signal corresponding to the detected difference.

APC unit 52 further includes a feed-forward correction amplifier 66, a compensation circuit 68, and a current drive circuit 70. The correction amplifier 66 has an input connected to the non-inverting input of the operational amplifier 56 at a circuit node N1, and an output coupled to a second input of the adder 64. An output voltage Vd of adder 64 appears at a node N2. Compensation circuit 68 has an input connected to node N2 and an output connected to node N1. An output current (compensation current) Ic of compensation circuit 68 flows through node N1, to which the above-mentioned laser monitor signal Im is also supplied. Current driver 70 is electrically coupled to the semiconductor laser device 16 containing laser chip 18.

The APC unit 52 is basically responsive to the control signal Vc and the reference signal V supplied by the record/playback controller 54. Control signal Vc is a voltage signal that is modulated in accordance with an information signal to be stored in the optical disk 12 in a write (record) mode. In a read (playback) mode, control signal Vc is a direct current (DC) voltage having a constant potential level. Reference signal Vr remains potentially constant throughout the both modes. Therefore, in the playback mode, a potential difference between terminals 58, 60 is kept unchanged. Such a constant terminal-to-terminal potential difference may determine the total amount of front light emitted by semiconductor laser device 16.

The feed-forward correction amplifier 66 is provided to compensate for a junction capacitance inherent in the photodetector 38, which capacitance will be a serious bar to further development in the broad-band laser power control. A compensation current Ic of compensator 68 flows in node N1, which is coupled to the inverting input of the main operational amplifier 56, in addition to the monitor current signal Im, whereby a response delay of monitor current Im that will possibly occur is compensated for by compensation current Ic to attain an expanded or broadened control range. The potential difference between the inverting input and the non-inverting input of amplifier 56 decreases due to the inflow of monitor current Im. This potential difference is amplified by correction amplifier 66 in a parallel manner. The amplified potential difference is added by adder 64 to the output voltage of main operational amplifier 56.

The output voltage Vd of adder 64 is then subjected to two different kinds of signal processing operations at node N2. In the first place, voltage Vd is applied to the current driver 70. Driver 70 carries out a voltage-to-current conversion internally to generate an output current, which is supplied to the semiconductor laser device 16 as a laser drive current. Semiconductor laser 16 oscillates and emits a laser light in response to the drive current. It can thus be said that the amount of a front light emitted by laser 16 is continuously controlled so that the potential difference between the inverting input and the non-inverting input of amplifier 56 is zero.

Secondly, the output voltage Vd of adder 64 is supplied by a wiring line 72 to a noise reduction circuit 74, which includes an AC-coupled buffer amplifier 76, a band-pass filter 78, a gain adjustment circuit 80, and a subtractor circuit 82. The AC-coupling frequency of buffer amplifier 76 is selected at several megahertz (MHz) so as to remove or eliminate a certain low frequency component, which is emphasized by the main operational amplifier 56 in the APC unit 52. Practically, such strict frequency setting may be unnecessary, because APC unit 52 exhibits some noise-reducing function by itself.

The band-pass filter 78 is an electrical filter that has an approximately uniform transmission characteristic only in a limited frequency band corresponding to that of the information signal recorded on the optical disk 12. Note that, since band-pass filter 78 is intended to compensate for a low-frequency transmission characteristic being inherently present in the information reproduction system through which the reproduced information signal 50 passes, it is theoretically desirable that band-pass filter 78 is substantially equivalent in characteristic to the information reproduction system. Practically, however, band-pass filter 78 will not be required to have so exact an equivalency or consistency in transmission characteristic. This may allow band-pass filter 78 to be merely comprised of a known one-dimensional low-pass filter.

The gain adjuster 80 includes a variable resistor, which potentially adjusts the output voltage of band-pass filter 78. The adjusted voltage signal is supplied to a first input of subtractor 82 as laser noise monitor signal 84 (Vns), which successfully represents a laser noise that is presently occurring. Subtractor 82 is supplied at its second input with the reproduced information signal 50. Subtractor 82 produces a signal 86 indicative of any difference between signals 50, 84, which signal 86 appears at an output of subtractor 82. Very importantly, signal 84 is a higher-fidelity noise signal that is principally the same in phase as an undesirable laser noise component actually contained in the reproduced information signal 50 and is thus indicative of the actual noise amount with almost complete fidelity. Therefore, the subtraction result obtained at the output of subtractor 86 may correspond to a pure reproduced information signal that can be maximally suppressed in inclusion or mixture of laser noise.

With such an arrangement, the laser-noise reduction circuit 74 is specifically responsive to the drive control signal Vd generated by the APC unit 52 for semiconductor laser device 16 emitting a read light-beam for the optical disk 12. The noise reduction control is performed by modifying signal Vd so as to be identical in characteristic with the information reproduction system to obtain noise monitor signal 84, and by subtracting this signal 84 from the reproduced information signal 50. Signal Vd indicates an actual noise being presently contained in the laser beam from the front APC-controlled semiconductor laser device 16. This can be said because the front APC operation is based of the detection signal Im that is obtained by guiding a part of the front light of laser 1 toward the photodetector 38 by the concave mirror 36, so that signal Vd potentially contains a noise component that is the same in phase as the actual laser noise component. As a result, the noise signal 84, which is obtained by post-processing the signal Vd, may represent at high accuracy the noise contained in the reflected light from optical disk 12, i.e., the light indicative of the stored information. (The reason for this is as follows: A high-frequency noise component being greater in frequency than the APC band and still remaining in signal 84 with a somewhat emphasized waveform after the processing of APC system as unremovable component. This means that a strong core relation is present between a laser noise component that possibly takes place in the reproduced information signal 50 and the noise signal 84.) Therefore, subtracting such a signal from the originally obtained reproduced information signal 50 makes it possible to provide a maximally noise-reduced or noise-free reproduced information signal. This can attain a maximized signal-to-noise ratio in the reproduction or playback of the optical disk 12.

Furthermore, with the embodiment apparatus 10, since the APC unit 52 is the circuitry that performs a "current-feedback control" wherein the detection signal Im of photodetector 38 is fed back in the form of current, APC unit 52 can be much expanded or widened in a controllable range than any conventional voltage-feedback control system. This can cause the wide range of the front APC system to further broaden. Such broadenment of the laser control will be advantageous to the manufacturers of optical disk drive apparatus, particularly in a case wherein the optical disk 12 is required to have a highly advanced capability to perform a successful record/playback of information having a higher frequency band such as extra high-precision motion-picture image.

Careful attention should be directed to the fact that the filtering band of the band-pass filter 78 and the gain adjustment amount of gain adjuster 80 are determined depending on the type of optical disk 12 being employed, the frequency band of the information signal contained in the reproduced signal 50, and the amplitude of the reproduced information signal (the variation in reflectance, and therefore the noise-level variation amplitude). In such a case, ideally, these parameters should be carefully determined so that the noise jitter of reproduced information signal 50 remains minimized with respect to the worst-case pattern with the window margin becomes narrowest in the information signal. The final determination of the best-mode setting may necessitate repetitions of a number of careful experiments and measurements. From the viewpoint of practical application, more simple arrangement is available. The above parameters may be determined so as to minimize the carrier-to-noise ratio (or the noise level) at the highest frequency of the reproduced signal 50. The experimental results made by the present inventors have demonstrated the fact that, even with such simplified parameter settings, the laser-noise reduction effect of more than 10dB could be accomplished at the highest frequency of the reproduced signal.

Figure 2:
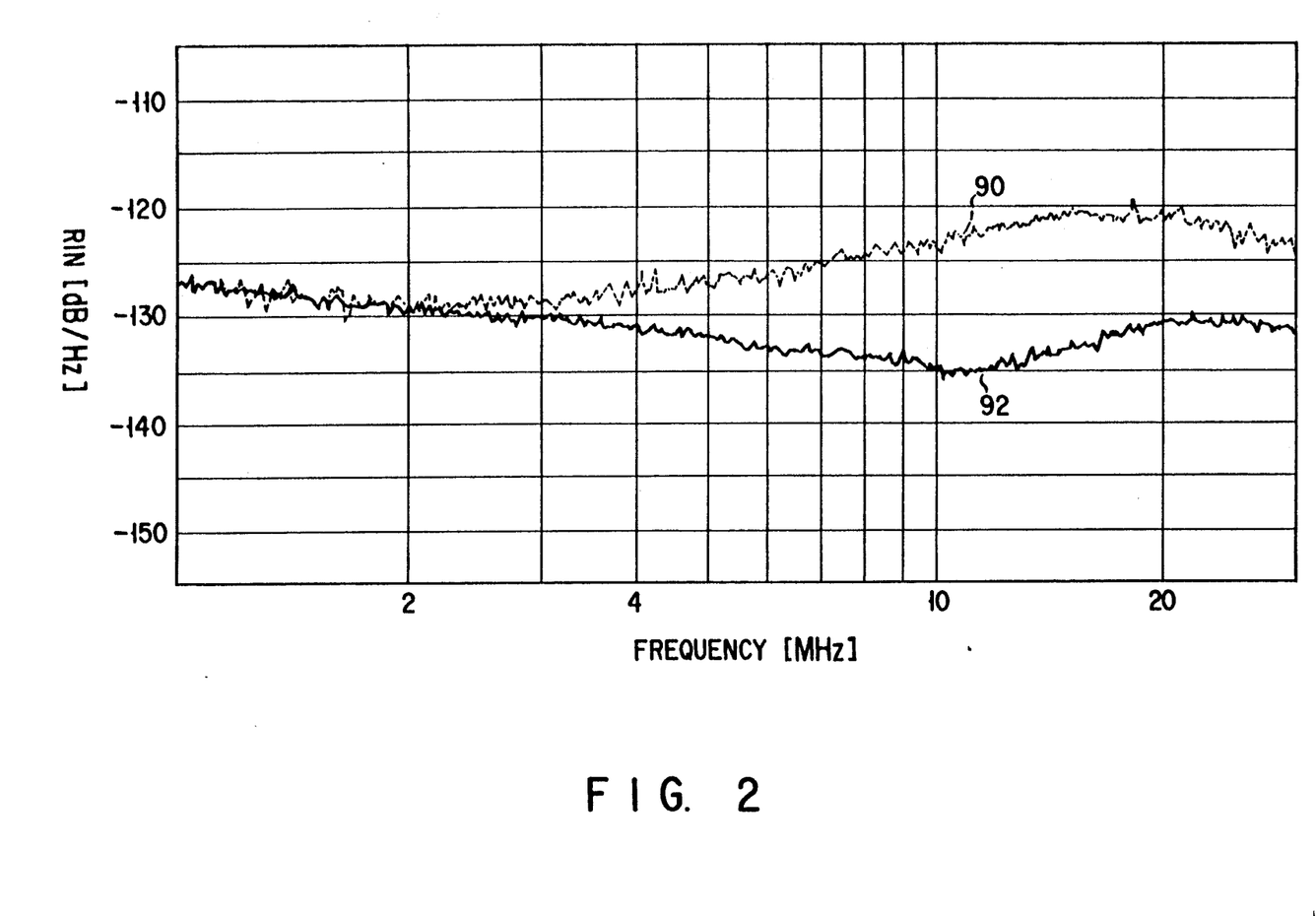
FIG. 2 is a characteristic diagram showing an experimental result of the relative-intensity-noise (RIN) versus frequency relation of a reproduced information signal in the embodiment of FIG. 1.

One of the experimental data demonstrating the significance of the noise reduction effect of the present invention is shown in FIG. 2, which is an experimentally obtained characteristic diagram exhibiting the frequency dependence of the relative-intensity-noise (RIN). A serrate curve 90 represents the noise characteristic of a "rare" reproduced information signal obtained by a conventional optical disk drive apparatus that does not employ the aforementioned noise reduction concept of the present invention based on the wideband front APC technology. A curve 92 indicates the noise characteristic of the noise-eliminated playback signal 8 obtained in the embodiment 10. It is apparent from viewing the graph of FIG. 2 that the present invention can achieve a successful noise reduction of more than 10 dB even in the high-frequency band of the front AP controllable range being as high as 10 to 20 MHz.

Figure 3:
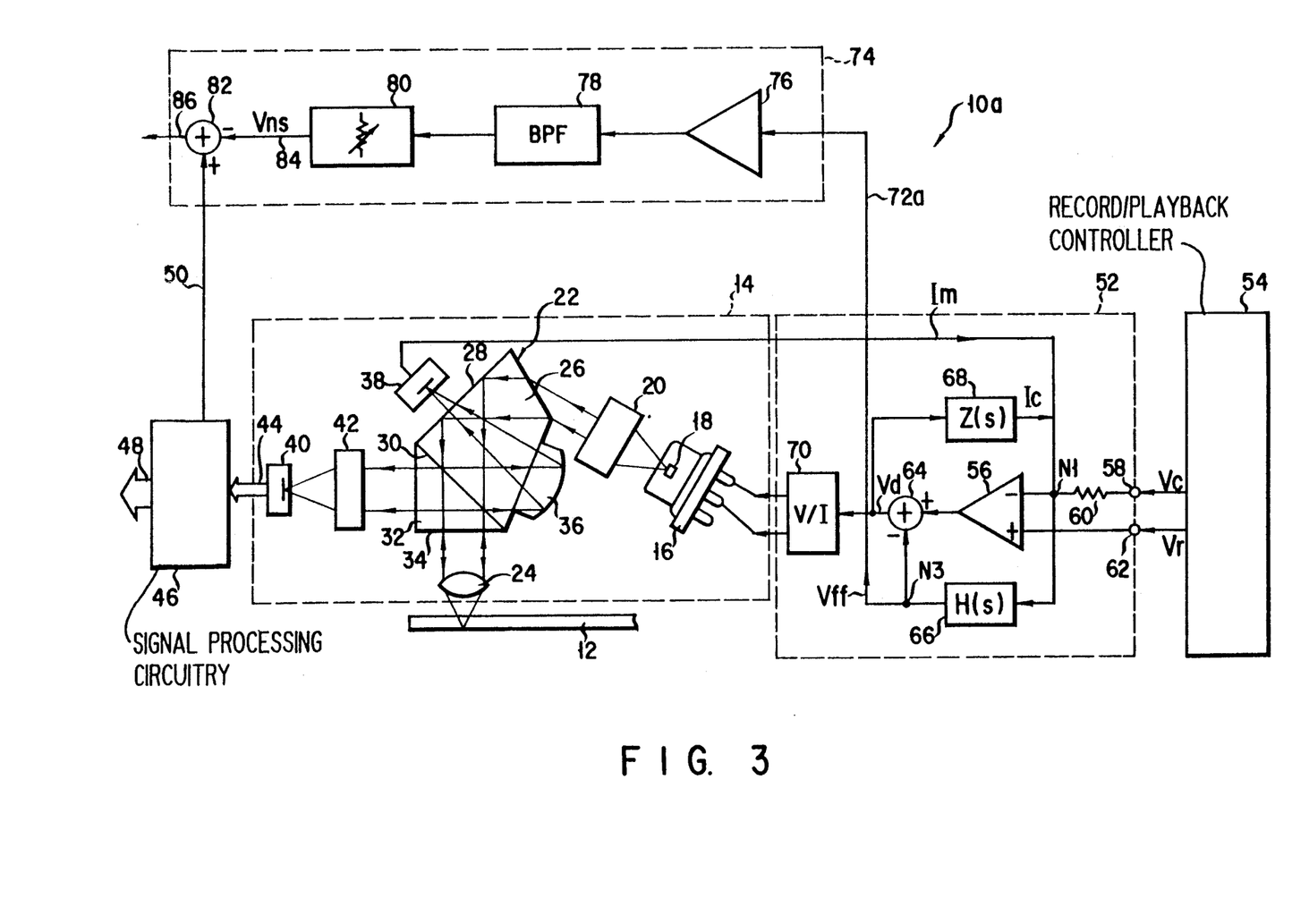
FIGS. 3, 4 and 5 are diagrams showing other embodiments of the optical disk record/reproduction apparatus according to the principles of the present invention.

An optical disk drive apparatus 10a shown in FIG. 3 is similar to the apparatus 10 of FIG. 1 with the input wiring line 72 of the noise reduction circuit 74 being replaced by a wiring line 72a, which is connected at a circuit node N3 to the output of the feed-forward correction amplifier 66. More specifically, noise reduction circuit 74 uses an output voltage signal Vff of correction amplifier 66 as the source of the laser noise monitor signal 84. Also with such an arrangement, the same technical advantages may be obtained.

Figure 4:
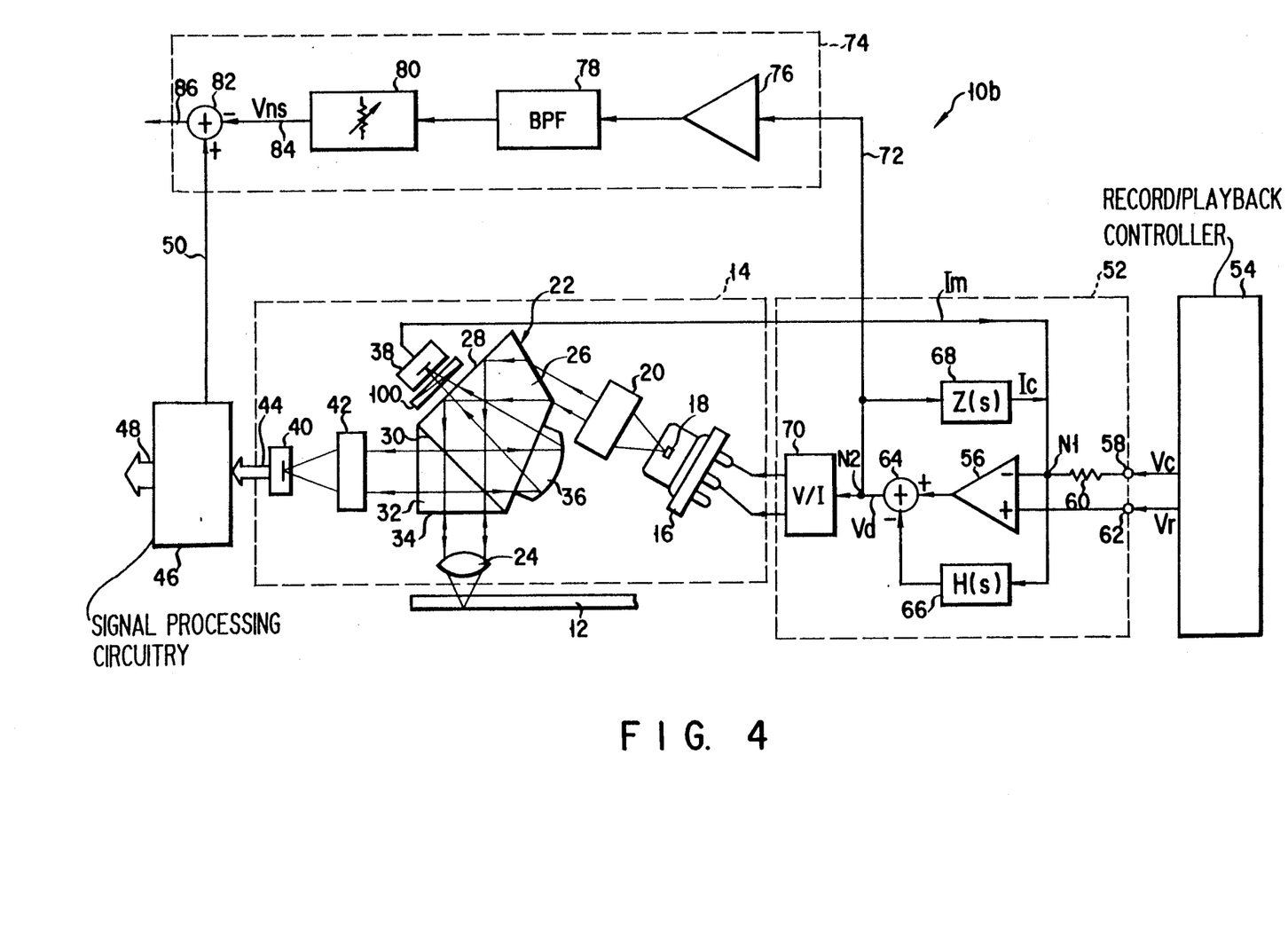

An optical disk drive apparatus 10b shown in FIG. 4 is similar to that of FIG. 1 with a polarizing plate member 100 being additionally disposed between the APC photodetector 38 and the circular beam total-reflection plane 28 of the compound prism structure 22. Such an addition of polarizer 100 may improve the strict consistency or coincidence in terms of the condition of polarization of light between (i) the optical path of information reproduction system through the optical planes 30, 34 in prism structure 22 and the surface of the optical disk 12 and (ii) the APC monitoring optical path via the internal optical plane 30 of prism structure 22 and the concave mirror 36. A resultant noise monitor signal 84 can thus be further improved in the accuracy of indication of noise occurring in the reproduced signal 50. Therefore, the finally obtained noise-reduced playback signal 86 can be much improved in the signal-to-noise ratio.

Figure 5:
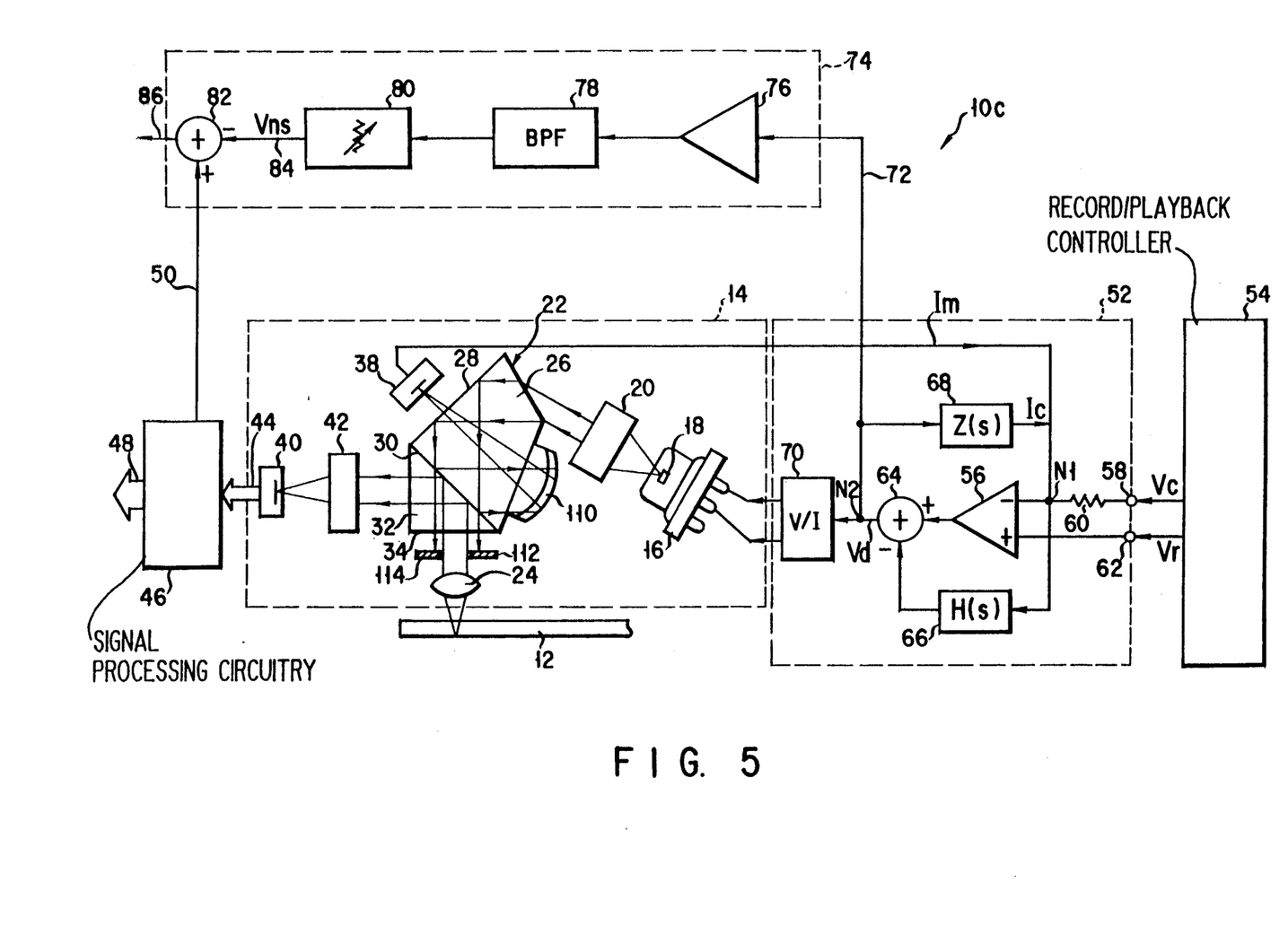

An optical disk drive apparatus 10c illustrated in FIG. 5 is similar to that of FIG. 1 with (1) the concave mirror 36 being replaced with a specific concave mirror with a spatial filter function, and (2) a luminous flux limiter 112 being added between the objective 24 and the λ/4 plate 34 of compound prism structure 22. The luminous flux limiter 112 has an aperture stop 114, which limits the profile or cross-section of a light beam that exits from prism structure 22 and travels toward objective 24, causing a thin light beam to be projected and focused on the optical disk 12. Concave mirror 110 causes a light beam component that exits from the polarization beam splitter 30 toward APC photodetector 38 and a light beam being actually projected onto optical disk 12 to become equivalent to each other in the optical conditions. Additionally, the light beam control means may alternatively be a spatial filter having a desired luminous flux transmission distribution characteristic, which is functionally equivalent to aperture stop 114.

Figure 6:
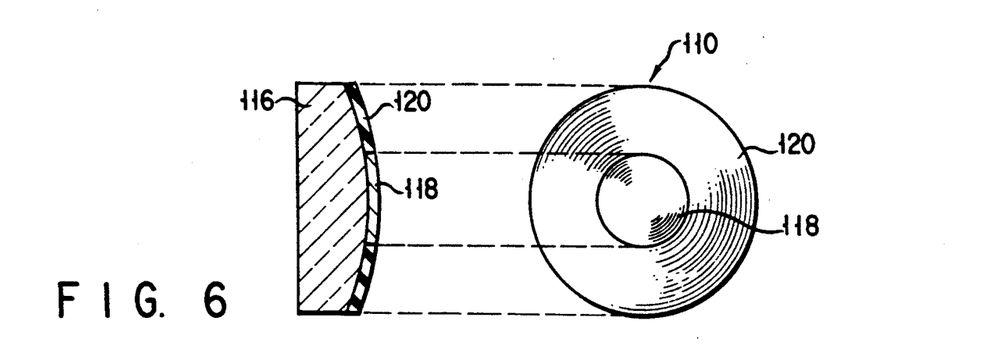
FIG. 6 is an illustration of a plan view and a corresponding cross-sectional structure of a concave mirror employed in the embodiment of FIG. 5, and FIGS. 7 and 8 are illustrations of two possible modifications of the concave mirror of the preceding figure.

As shown in FIG. 6, the concave mirror 110 has round transparent base layer or substrate 116 with a flat surface and a spherical surface (which may alternatively be a spherical surface). In the central area of substrate surface, a round high-reflectivity film 118 is arranged such that it is substantially the same in diameter as the aperture stop 114 of FIG. 5. The remaining surface area, i.e., a ring-shaped surface area of substrate 116 is covered by a low-reflectivity film 120. High-reflectivity film 118 may be metallic film. Typically, film 118 may be made from aluminum. This film 118 may alternatively be dielectric multi-layer films. Low-reflectivity film 120 may be a single layer or multilayers made from a selected dielectric material, such as silicon oxide. Film 120 may also be made from a light absorption material, such as gelatin film containing organic dye, if required.

With the addition of the concave mirror 110 having a spatial filter function and the luminous limiter 112, it becomes possible, by suitably arranging the optical characteristics of concave mirror 110 in accordance with that of additional luminous limiter 112, to further enhance the accuracy of consistency or coincidence between (i) the spatial distribution condition of the optical path of information reproduction system through the internal optical planes 30, 34 of the compound prism structure 22 and the surface of the optical disk 12, and (ii) that of the APC monitoring optical path through the internal optical plane 30 and concave mirror 110. This results in that the noise monitor signal 84 can be improved in the accuracy of indicating noise being contained in the reproduced signal 50, thereby to further enhance the signal-to-noise ratio of the noise-eliminated reproduction signal 86.

Figure 7:
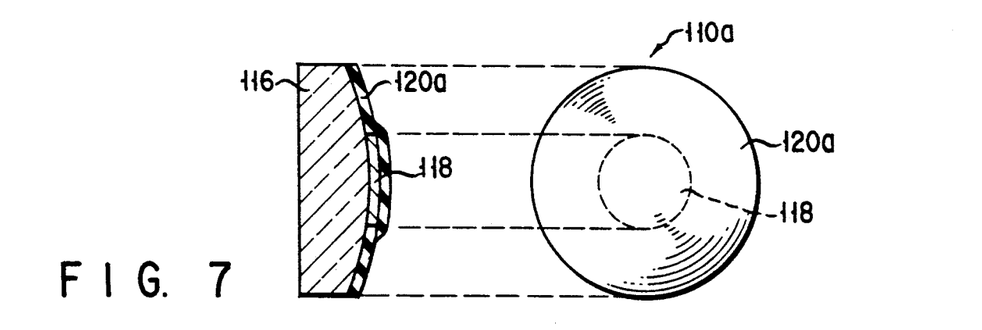
Figure 8:
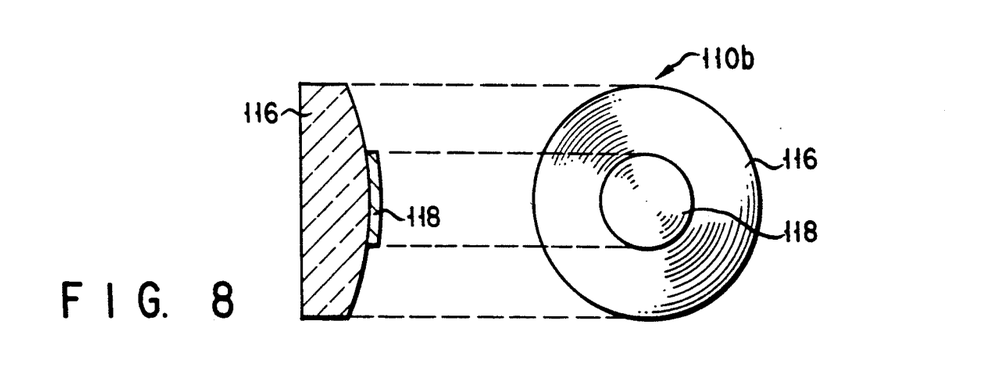

The concave mirror structure of FIG. 6 may be modified as shown in FIG. 7 or 8. A concave mirror 110a of FIG. 7 has a low-reflectivity film 120a, which expands to cover the central high-reflectivity film 118 on the round transparent substrate 116. The low-reflectivity film 120 of FIG. 6 is not provided in a concave mirror 110b shown in FIG. 8. When reduction to practice, the structure of FIG. 8 will be recommendable if the low-cost requirement is the first priority in the manufacture of the optical disk drive apparatus.

Figure 9:
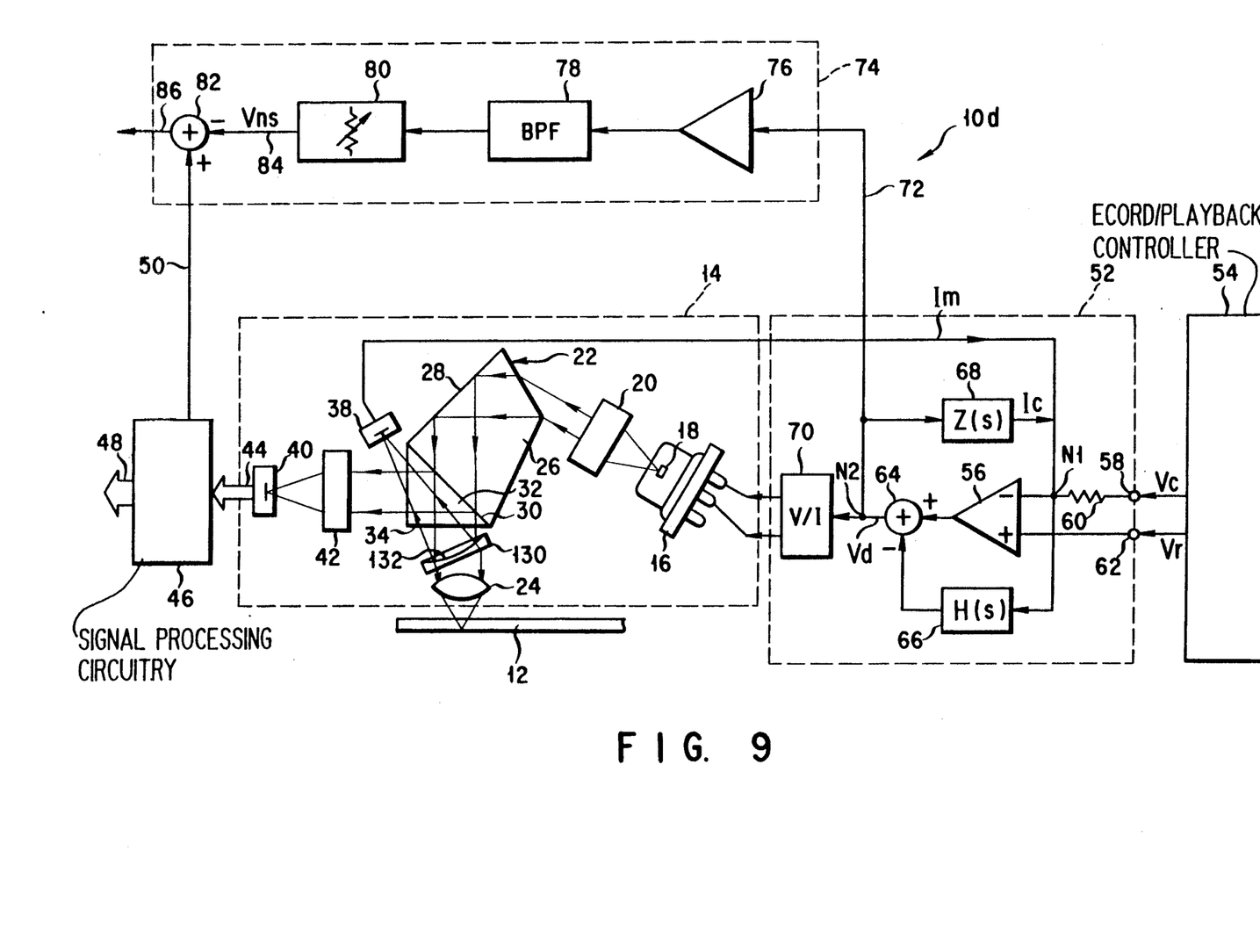
FIG. 9 illustrates a further embodiment of the optical disk record/reproduction apparatus according to the principles of the present invention.

An optical disk drive apparatus 10d shown in FIG. 9 is similar to that of FIG. 1 with (1) the concave mirror 36 of FIG. 1 being removed, and (2) a beam splitter 130 being inserted between the λ/4 plate 34 of compound prism structure 22 and the objective 24. Beam splitter 130 is tilted in the optical path between λ/4 plate 34 and objective 24. Beam splitter 130 essentially consists of a plano-convex lens, a plano-concave lens, and a concave mirror 130 being sandwiched therebetween and having the reflectivity of 10%. Concave mirror 132, which causes approximately 10% of an incident light passed through λ/4 plate 34 to be reflected to and concentrated on the APC photodetector 38, while permitting the remaining 90% light component to pass through mirror 132 toward objective 24, which causes it to be projected on optical disk 12. The light beam is reflected by optical disk 12 and returns along itself. The reflected light is then converted by objective 12 into a parallel luminous flux, which is divided by beam splitter 130 into approximately 90% of the reflected light beam passing through splitter 130 and the remaining about 10% thereof being reflected away by the back surface of concave mirror 132 as unnecessary diverging rays. The light passed through beam splitter 130 is totally reflected by the polarization beam splitter 30 toward multi-division photodetector 40 by way of condenser 42.

With such an arrangement, the APC front monitor light is obtained by using the additional beam splitter 130, which acts as a concave mirror with respect to a reflected light and functions as an optical parallel substrate for a transmission light. The front monitor light is taken out of the light beam being passed through the polarization beam splitter 30 to optical disk 12; therefore, it is possible to cause the optical systems of the reproduction beam system and of the APC front monitor system to coincide in optical conditions with each other at higher accuracy without making use of the polarizer 100 employed in the embodiment of FIG. 4. This may lead to an improvement in the monitoring accuracy of the noise monitor signal 84.

The present invention is not limited to the above-described specific embodiments and may be practiced or embodied in still other ways without departing from the spirit or essential character thereof.

By way of examples, while the compound prism structure 22 is employed in the optical head section 14 in the above embodiments, it may be replaced with an optical-path division structure using a dividing mirror member. The internal arrangement of the laser-noise reduction circuit 74 may also be modified as required when reduced to practice. For example, a capacitive element may be added to a single-stage transistor amplifier to attain a low-pass filter characteristic, causing the buffer amplifier 76 to be coupled together with the band-pass filter 78. Alternatively, buffer amplifier 76 may be modified to have the function of the gain adjuster 80; a resistive load in band-pass filter 78 may also be used to achieve the gain adjustment function therein. Buffer amplifier 76 may be added with an automatic gain-adjustment function in response to a variation in the actual reflectance of the optical disk 12 and/or the level design of the reproduced information signal 50. A non-linear optical device such as a secondary harmonic generator (SHG) may be additionally disposed between the light emission end of the semiconductor laser device 16 and the collimator lens 20, causing the laser light beam to be subjected to an optical frequency conversion process.

What is claimed is:

1. An apparatus for suppressing or eliminating a noise from a reproduced information signal read out of an optical record carrier body using a slid-state light emission device, said apparatus comprising:
   driver means for receiving a control voltage signal externally supplied thereto to designate a light emission of said light emission device, and for supplying said light emission device with a corresponding drive current signal in response to the control signal;
   optical detector means for partially receiving a light sent forth from said light emission device, and for generating a detection current signal corresponding in magnitude to a detected amount of light;
   compensator means coupled to said driver means and said optical detector means, for generating a voltage signal that compensates for a possible variation in the light sent forth from said light emission device, which si supplied to said driver means; and
   noise reduction means for receiving the voltage signal and the reproduced information signal, for using said voltage signal as a noise monitor signal, and for subtracting this noise monitor signal from said reproduced information signal to generate a noise-suppressed reproduction signal.

2. The apparatus according to claim 1, wherein said compensator means comprises:
   an operational amplifier having an inverting input at which said detection signal is supplied, a noninverting input and an output;
   feed-forward correction amplifier having an input connected to the inverting input of said operational amplifier, and an output; and
   adder means connected to the output of said operational amplifier and the output of said correction amplifier, for generating an output signal, which is supplied to said light emission device.

3. The apparatus according to claim 2, further comprising:
   signal transmission means for causing said output signal of said adder means to be also supplied to said noise reduction means as said noise monitor signal.

4. The apparatus according to claim 2, further comprising:
   signal transmission means for causing an output signal of said adder means to be also supplied to said noise reduction means as said noise monitor signal.

5. The apparatus according to claim 2, wherein said noise reduction means comprises an electrical circuitry including a band-pass filter, a gain-adjustment circuit and a subtractor.

6. The apparatus according to claim 2, wherein said compensator means further comprises:
   a resistive element connected to the inverting input of said operational amplifier, said compensator means receiving said control voltage signal through said resistive element, and detecting a difference between said detection current signal and a control current signal flowing in said resistive element to generate a voltage signal corresponding to a detected difference as said voltage signal that compensates for a possible variation in the light sent forth from by said light emission device.

7. The apparatus according to claim 2, further comprising:
   optical means for guiding the light sent forth from said light emission device toward said optical record carrier body, for receiving a reflected light from said optical record carrier body, and for providing a first optical path for forcing the reflected light to progress to a predetermined position, and a second optical path for causing a part of the reflected light to be given to said optical detector means.

8. The apparatus according to claim 7, further comprising:
   another optical detector means arranged at said predetermined position, for generating an electrical signal corresponding to an incident light/-thereonto, said electrical signal being used as a source for generation of said reproduced information signal.

9. The apparatus according to claim 7, wherein said optical means includes a compound prism structure, and wherein said apparatus further comprises:
   a polarizing plate member arranged between said compound prism structure and said optical detector means for guiding the light sent forth from said light emission device.

10. The apparatus according to claim 7, wherein said optical means includes a compound prism structure, and wherein said apparatus further comprises:

spatial filter means provided in said second optical path, for causing light components in the first and second paths to be substantially identical with each other in optical conditions.

11. The apparatus according to claim 10, further comprising:

luminous flux limiter means for limiting a luminous flux to or from said optical record carrier body between said compound prism structure and said optical record carrier body.

12. The apparatus according to claim 11, wherein said spatial filter means includes:

a concave mirror being different in reflectivity between its central area and a peripheral area thereof.

13. The apparatus according to claim 12, wherein said optical record carrier body includes a round disk-shaped optical recording medium.

14. An optical reproduction system for a rotatable round disc-shaped optical record carrier body, comprising:

a semiconductor laser for emitting and sending forth a light beam as a front light;

an automatic power control circuit for driving said semiconductor laser;

a first optical detector;

a second optical detector;

optical means optically coupled to said semiconductor laser, for defining a first optical path which causes the front light of said semiconductor laser to be projected onto said optical record carrier body and which guides a reflected light from said optical record carrier body toward said first optical detector, and a second optical path for guiding apart of the reflected light also toward said second optical detector;

said first optical detector generating an electrical signal corresponding to an incident light thereunto, which signal is used to generate a reproduced information signal;

said second optical detector generating an electrical signal corresponding to an incident light thereunto, which signal is fed back to said automatic power control circuit as a front light monitor signal;

signal transmitter means for causing a part of a laser control signal internally generated in said automatic power control circuit to be taken out of said automatic power control circuit externally; and a noise reduction circuit connected to said signal transmitter means, for using said part of said laser control signal as a laser noise monitor signal, and for subtracting this laser noise monitor signal from said reproduced information signal to provide a noise-suppressed or eliminated reproduced information signal.

15. The system according to claim 14, wherein said automatic power control circuit includes:

an operational amplifier having an inverting input, a non-inverting input and an output, said front light monitor signal being supplied to said inverting input;

a correction amplifier having an input connected to said inverting input, and output;

an adder having an input connected to said output of said operational amplifier and said output of said correction amplifier, and an output; and a current drive circuit for supplying a drive current to said semiconductor laser in response to the output of said adder.

16. The system according to claim 15, wherein said automatic power control circuit further includes:

resistor means connected to said non-inverting input of said operational amplifier, for receiving a control voltage signal from a optical record and reproduction circuit adapted to be connected to said automatic power control circuit, and for converting the control voltage signal into a corresponding current signal, which is supplied to said operational amplifier.

17. The system according to claim 16, wherein said automatic power control circuit further includes:

compensation circuit having an input connected to said output of said adder, and an output connected to said inverting input of said operational amplifier.

18. The system according to claim 15, wherein said signal transmitter means supplies a voltage at said output of said adder to said noise reduction circuit.

19. The system according to claim 15, wherein said signal transmitter means supplies a voltage at said output of said correction amplifier to said noise reduction circuit.

20. The system according to claim 15, further comprising:

optical adjuster means for optimizing optical characteristics of said optical means such that the first and second optical paths of said optical means are substantially identical with each other in optical conditions.

21. The system according to claim 20, wherein said optical adjuster means includes:

a polarizing plate member inserted in said second optical path of said optical means in front of said second optical detector.

22. The system according to claim 20, wherein said optical adjuster means includes:

a luminous flux limiter inserted in said first optical path of said optical means, for limiting a light to or from said optical record carrier body; and a concave mirror inserted in said second optical path of said optical means, and different in reflectivity between a specific area and a remaining area thereof to thereby cause the reflected light guided toward said second optical detector to decrease in profile in accordance with said luminous flux limiter.

23. The system according to claim 15, wherein said noise reduction circuit includes a band-pass filter, a gain adjustment circuit and a subtractor.

24. The system according to claim 23, wherein said noise reduction circuit further includes a buffer amplifier being arranged in front stage of said band-pass filter, and having an AC coupling frequency determined so as to remove an emphasized low-frequency component in said operational amplifier.

25. The system according to claim 23, further comprising:

a signal processing circuit coupled to said first optical detector, for generating said reproduced information signal and a servo signal for focusing/tracking control in response to said electrical signal of said first optical detector, said signal processing circuit being connected to said subtractor

* * * * *